United States Patent [19]

Egawa et al.

[11] 4,082,688

[45] Apr. 4, 1978

[54] PROCESS FOR PRODUCING MICROCAPSULES

[75] Inventors: Setsuya Egawa; Masahiro Sakamoto, both of Naka; Toshihiko Matsushita, Hiratsuka, all of Japan

[73] Assignee: NCR Corporation, Dayton, Ohio

[21] Appl. No.: 697,586

[22] Filed: Jun. 18, 1976

Related U.S. Application Data

[63] Continuation of Ser. No. 409,110, Oct. 24, 1973, abandoned.

[30] Foreign Application Priority Data

Dec. 14, 1972 Japan .................................. 47-125738

[51] Int. Cl.$^2$ ............................................ B01J 13/02
[52] U.S. Cl. .................................. 252/316; 282/27.5; 427/151; 427/152; 427/338; 428/307; 428/914
[58] Field of Search .................... 252/316; 424/34, 37; 427/338

[56] References Cited

U.S. PATENT DOCUMENTS

| | | | |
|---|---|---|---|
| 2,969,331 | 1/1961 | Brynko et al. | 252/316 |
| 3,041,289 | 6/1962 | Katchen et al. | 252/316 |
| 3,043,782 | 7/1962 | Jensen | 252/316 |
| 3,687,865 | 8/1972 | Katayama et al. | 252/316 |
| 3,956,172 | 5/1976 | Saeki et al. | 252/316 |

*Primary Examiner*—Richard D. Lovering
*Attorney, Agent, or Firm*—J. T. Cavender; E. Frank McKinney

[57] ABSTRACT

A process is disclosed for producing microcapsules, which comprises gelating oil-containing capsules having capsule walls of coacervates, and using at least two kinds of chemical hardening agents in a hardening step; —the hardening agent to be added at first serving to act slowly upon the capsule walls and the hardening agent to be added later serving to act rapidly.

2 Claims, No Drawings

PROCESS FOR PRODUCING MICROCAPSULES

This is a continuation, of application Ser. No. 409,110, filed Oct. 24, 1973, now abandoned.

SUMMARY OF THE INVENTION

This invention relates to a process for producing oil-containing microcapsules consisting of coacervate capsule walls of colloidal material, and more particularly to a process, where microcapsules are prepared by a coacervation process, using gelatin as at least one of the hydrophilic colloids and a negatively-electrically charged hydrophilic polymeric material as at least one of the hydrophilic colloids, which process comprises using at least two kinds of hardening agents in a hardening step. Negatively-electrically charged hydrophilic materials are found in the prior art and include: gum arabic; maleic anhydride copolymers such as vinyl methyl ether, styrene, acrylic acid, vinyl acetate and ethylene; carboxymethyl cellulose; alginates such as sodium alginate: carrageenan; and the like. Among the two kinds of the chemical hardening agents, the hardening agent to be added at first to gelatin acts slowly, and the hardening agent to be added later acts rapidly, to effect hardening.

When microcapsules are prepared with only one kind of the hardening agent according to the conventional process, and further when the conditions for coacervation are not sufficient, the viscosity of the system is greatly increased, where the pH of the system is approximately equal to the isoelectric point of the gelatin during the operation of converting the pH rapidly to an alkaline side in the hardening treatment, and consequently the capsules are coagulated. To prevent the coagulation, it is necessary to age the encapsulating system for a long period of time under mild conditions below the normal temperature, and the aging step has been a bottleneck in capsule production. Microcapsules containing an oily liquid, which are prepared according to the prior art processes, are multi-nuclear capsules in the shape of bunches of grapes. U.S. Pat. No. 3,041,289, issued June 26, 1962, discloses the occurrence of capsule agglomeration on conversion of the system to an alkaline pH. When such microcapsules are used in pressure-sensitive copying paper, there is deterioration of resolving powers of color-developed letters when a large number of sheets are copied, because the capsules are as large as 6 to 7 microns. Furthermore, these capsules have been bottlenecks in increasing coating speed and winding speed in the capsule application step of the copy paper production. Further, since the capsule walls of the prior art do not have a sufficient strength and toughness, the capsules must enclose a smaller amount of contents. Therefore, to increase the deepness of color of copying letters on the pressure-sensitive copying paper, a large amount of dyestuff must be dissolved. As a solvent suitable for the pressure-sensitive copying paper, which can dissolve a large amount of dyestuff (CVL, BLMB and other colorless dyestuff), halogenated biphenyls are not used at the present for ecological reasons, and there is no completely acceptable substitute solvent. However, any substantially water-insoluble organic liquid, capable of dissolving an eligible dye, can be used. Examples include: kerosene and diallylethane and dialkylnaphthalene.

An object of the present invention is to prepare mononucleic microcapsules containing an oily liquid by providing capsule walls with a strength and toughness adequate to minimize the capsule wall thickness, thereby increasing the capacities of the capsules.

Another object of the present invention is to produce microcapsules containing an oily liquid, which capsules permit an increased coating speed and a shortened winding time in the capsule application step.

A further object of the present invention is to produce mononucleic microcapsules containing an oily liquid, which capsules afford less contamination in the pressure-sensitive paper due to less breakage of the capsules.

Said objects of the present invention can be attained by: forming films of colloid of multi-valent electrolyte around hydrophobic oil droplets by a coacervation process to prepare coacervates; gelating wall films of coacervates at a pH less than 7.0; adding thereto, first, a relatively slow acting hardening agent thereby to effect gradual hardening; adding thereto, second, a relative rapid acting hardening agent in the presence of a negatively-electrically charged hydrophilic polymeric material; and converting the system to an alkaline condition greater than pH 8.0.

The relatively slow acting hardening agents used in the present invention include: formaldehyde; 2,3-dihydroxy-1,4-dioxane; glyoxal, and the relatively rapid acting hardening agents include: glutaraldehyde; 2-methylglutaraldehyde; and acrolein. Said relatively slow acting hardening agents and relatively rapid acting hardening agents can be used in combinations of one kind, as desired. Further, said relatively slow acting hardening agents are used in an amount of 5 percent, by weight, or more, preferably 5 to 10 percent by weight, based on the gelatin, and said relatively rapid acting hardening agents are used in an amount of 5 percent, by weight, or more, preferably 5 to 10 percent, by weight.

Negatively-electrically charged hydrophilic polymeric materials have been listed, hereinabove, and are used in an amount of 80 percent, by weight, or more, preferably 80 to 200 percent, by weight, based on the gelatin.

To solidify the coacervate capsule wall material accumulated on the surfaces of oil droplets after the coacervation step, a vessel is cooled from its outside, thereby gelating the wall films. To harden the wall films, a slow acting hardening agent, such as formaldehyde, is added thereto. On the contrary, when a rapid acting agent, such as glutaraldehyde, is added thereto, at first, the object of the present invention, that is, production of mononucleic capsules having a good strength and toughness, cannot be attained.

DESCRIPTION OF PREFERRED EMBODIMENTS

Now the present invention will be explained in detail by way of example, but the present invention is not limited to these examples. Unless otherwise noted, all percentages represent percent, by weight.

EXAMPLE 1

Twenty-two (22) grams of acid-treated gelatin was dissolved in 216 grams of water at 46 degrees centigrade, and 164 milliliters of a 3:1, by volume, solvent mixture of diallylethane and kerosene containing 2.0 percent of crystal violet lactone (CVL) in a solution state was added to the colloidal solution, and emulsified with vigorous agitation, whereby an oil-in-water emulsion was formed. The vigorous agitation was discontinued when the sizes of oil droplets reached 1 to 2 microns. Then, 200 grams of an 11 percent aqueous gum arabic solution at 55 degrees centigrade was added thereto, with moderate stirring which was continued. Then, 680 grams of warm water was added thereto, while containing the stirring. Then, 50 percent aqueous acetic acid was added thereto, dropwise, to adjust the pH to 4.85.

The vessel was cooled from the outside, while the stirring was continued, and colloidal walls thus accumulated were fixed to the oil droplets. When a liquid temperature reached about 10 degrees centigrade, 4 milliliters of 37 percent aqueous formaldehyde was added thereto. 33 milliliters of 5 percent aqueous solution of poly(methylvinyl ether-co-maleic anhydride) (which will be hereinafter designated as "PVM/MA") was added thereto. Viscosity of the system was temporarily increased by the addition of the PVM/MA, but decreased again to a lower viscosity after addition of a sufficient amount thereof.

Then, 2.5 milliliters of 50 percent aqueous glutaraldehyde was added thereto, while keeping the solution temperature at about 10 degrees centigrade, and the system was converted from pH 5.5 to 11.0 with a 20 percent aqueous sodium hydroxide solution to complete the hardening. The time required for the dropwise sodium hydroxide addition was about 5 minutes.

Microscopic observation of the capsule system, thus obtained, revealed that more than 95 percent, by number, consisted of mononucleic capsules of single emulsified droplets. The capsules were coated upon test paper and subjected to a heat resistance test at 150 degrees centigrade for 3 hours, and then the dye-containing capsule paper, thus prepared, was used in copying with a sensitized receiving sheet, whereby clearly color-developed marks were obtained.

EXAMPLE 2

Microcapsules were prepared in the same manner as in Example 1, using 3.5 milliliters of 40 percent aqueous glyoxal in place of the hardening agent, formaldehyde, and 6 milliliters of 25 percent aqueous 2-methylglutaraldehyde in place of glutaraldehyde of Example 1. It was found that more than 95 percent, by number, of the capsules were mononucleic, as in Example 1. The capsules were coated upon test paper and prepared into copying paper, which produced clearly color-developed marks.

EXAMPLE 3

Twenty-two grams of acid-treated gelatin was dissolved in 216 grams of water at 46° centigrade. 200 milliliters of a 9:1, by volume, solvent mixture of alkylnaphthalene (boiling point 250°-350° C) and kerosene containing 1.5 percent of crystal violet lactone (CVL) and 1.0 percent of benzoylleucomethylene blue (BLMB), in solution, was added to the colloidal solution, and emulsified with vigorous agitation, thereby forming in oil-in-water emulsion. The vigorous agitation was discontinued when the sizes of oil droplets reached 1 to 2 microns. 200 grams of an 11 percent aqueous gum arabic solution at 55 degrees centigrade was added thereto with moderate stirring which was continued. Then, 750 grams of warm water was added thereto while continuing the stirring. Then, 50 percent aqueous acetic acid was added thereto dropwise to adjust the pH to 4.85. The vessel was cooled from the outside, while continuing the stirring to fix colloidal walls accumulated on oil droplets. When the liquid temperature reached about 10° centigrade, 5 milliliters of 37 percent aqueous formaldehyde was added thereto. 50 milliliters of 4 percent aqueous solution of the sodium salt of carboxymethylcellulose was added thereto, while still continuing the stirring. The viscosity of the system was temporarily increased by the addition of the carboxymethylcellulose, but decreased to a lower viscosity after addition of a sufficient amount thereof.

Then, 10 milliliters of 20 percent aqueous acrolein was added thereto, while keeping the liquid temperature at about 10 degrees centigrade, and the system was converted from pH 5.5 to 11.0 with a 20 percent aqueous sodium hydroxide solution to complete the hardening. The time required for addition of the sodium hydroxide was 5 minutes.

Microscopic observation of the capsule system thus obtained revealed that more than 95 percent, by number, were mononucleic capsules of single droplets. The capsules were coated onto test paper, subjected to a heat resistance test at 150 degrees centigrade for 3 hours, and then the dye-containing capsule paper, thus prepared, was used in copying with a sensitized receiving sheet, whereby clearly color-developed marks were obtained.

Reference Example 1

The colloidal walls accumulated on oil droplets were fixed in the process for producing microcapsules of Example 1, and 2.5 milliliters of 50 percent aqueous glutaraldehyde was added thereto when the liquid temperature reached 10 degrees centigrade. 33 milliliters of 5 percent aqueous solution of PVM/MA was added thereto, while continuing moderate stirring, and then 4 milliliters of 37 percent aqueous formaldehyde was added thereto. Then, as before, the system was converted to a pH of about 11.0. The viscosity of the system increased during the conversion, and the hardening was completed; but it took one hour by effecting vigorous agitation to prevent coagulation. Capsules thus obtained contained more than 90 percent, by number, of multinucleic capsules, and their sizes were in a range of 5 to 10 microns. The desired mononucleic capsules were not obtained.

Reference Example 2

The colloidal walls accumulated on the oil droplets were fixed in the process for producing the microcapsules of Example 1, and only 5 milliliters of 50 percent aqueous glutaraldehyde or 8 milliliters of 37 percent aqueous formaldehyde was added thereto, when the liquid temperature reached 10 degrees centigrade. PVM/MA was added thereto, while still continuing the stirring; and then, as before, the system was converted to an alkaline pH but all the capsules were coagulated at pH 6.8.

What is claimed is:

1. A process for preparing mononucleic capsules having chemically hardened walls of hydrophilic polymeric material and an average diameter of less than about five microns consisting essentially of the steps of:
   (a) establishing, at a pH less than 7.0, an agitating aqueous system of mononucleic capsules having an average diameter of less than about five microns and capsule walls comprising a gelled complex coacervate combination of gelatin and a negatively-electrically charged hydrophilic polymeric material;

(b) adding to the system, once established, from 5 to 10 percent, by weight, of the amount of the gelatin present in the system, of a relatively slow acting chemical hardening agent for the capsule walls selected from the group consisting of formaldehyde, glyoxal, and 2,3-dihydroxy-1,4-dioxane;

(c) after completion of the addition of step (b), adding to the system from 80 to 200 percent, by weight, of the amount of gelatin present in the system, of a negatively-electrically charged hydrophilic polymeric material selected from the group consisting of gum arabic, poly(vinylmethylether-co-maleic anhydride), poly(styrene-co-maleic anhydride), poly(acrylic acid-co-maleic anhydride), poly(vinylacetate-co-maleic anhydride), poly(ethylene-co-maleic anhydride), carboxymethyl cellulose, sodium alginate and carrageenan;

(d) after completion of the addition of step (c), adding to the system from b 5 to 10 percent, by weight, of the amount of gelatin present in the system, of a relatively rapid acting chemical hardening agent for the capsule walls selected from the group consisting of glutaraldehyde, acrolein and 2-methylglutaraldehyde; and (e) after completion of the addition of step (d), raising the pH of the system to greater than 8.0.

2. The process of claim 1 wherein the negatively-electrically charged hydrophilic polymeric material of the complex coacervate combination of step (a) is gum arabic.

* * * * *